US012599122B2

(12) United States Patent
Bernal

(10) Patent No.: US 12,599,122 B2
(45) Date of Patent: Apr. 14, 2026

(54) ROTATING SUPPORT FOR INSECT TRAP

(71) Applicant: Ricardo Alvarado Bernal, Mexico City (MX)

(72) Inventor: Ricardo Alvarado Bernal, Mexico City (MX)

( * ) Notice: Subject to any disclaimer, the term of this patent is extended or adjusted under 35 U.S.C. 154(b) by 301 days.

(21) Appl. No.: 17/716,766

(22) Filed: Apr. 8, 2022

(65) Prior Publication Data

US 2023/0072347 A1      Mar. 9, 2023

(30) Foreign Application Priority Data

Sep. 29, 2021    (MX) ............................... 2021/011918

(51) Int. Cl.
*A01M 1/10*          (2006.01)

(52) U.S. Cl.
CPC ....... *A01M 1/106* (2013.01); *A01M 2200/012* (2013.01)

(58) Field of Classification Search
CPC ...... A01M 1/10; A01M 1/106; A01M 1/2016; A01M 2200/012; Y10T 403/32213; A44B 15/00; A44B 15/002
USPC ........ 43/60, 107, 122, 132.1; D22/122, 127; 248/59; 403/78; D3/207; 70/456 R, 459
See application file for complete search history.

(56) References Cited

U.S. PATENT DOCUMENTS

| | | | | |
|---|---|---|---|---|
| 766,890 | A * | 8/1904 | Newbery ................ | F16L 3/133 248/62 |
| 2,599,660 | A * | 6/1952 | Poutinen ............... | F16B 45/049 24/601.6 |

| | | | | |
|---|---|---|---|---|
| 3,473,251 | A * | 10/1969 | Kahn ..................... | A01M 1/223 43/112 |
| 3,523,668 | A * | 8/1970 | Logsdon ................... | F16L 3/14 248/59 |
| 3,835,577 | A * | 9/1974 | Soulos .................... | A01M 1/04 43/112 |
| 3,863,384 | A * | 2/1975 | Weatherston ........... | A01M 1/14 43/114 |
| 4,026,507 | A * | 5/1977 | Thiedemann ......... | F16L 3/2053 248/59 |
| 4,121,371 | A * | 10/1978 | Kaphengst ............ | A01M 1/223 43/112 |
| 4,182,069 | A * | 1/1980 | De Yoreo ................ | A01M 1/04 43/112 |
| 4,752,072 | A * | 6/1988 | Parsons ................ | A44B 15/005 463/47.4 |
| 5,161,800 | A * | 11/1992 | Parsons ................. | F41B 15/025 463/47.4 |
| 5,595,018 | A * | 1/1997 | Wilbanks .............. | A01M 1/223 43/112 |
| 5,667,441 | A * | 9/1997 | Parsons ................. | F41B 15/027 463/47.7 |
| 6,820,363 | B1 * | 11/2004 | Averette, Jr. ........ | A01M 31/008 239/45 |

(Continued)

*Primary Examiner* — Jonathan Liu

*Assistant Examiner* — Guang H Guan

(74) *Attorney, Agent, or Firm* — Nixon & Vanderhye PC

(57) ABSTRACT

The present invention refers to a Rotating Support for Insect Trap, in which the insect trap has a connection mechanism to be attached to a rotating support, thus having a trap that is not affected by movement, as the rotating support remains fixed to the insect trap and fixed and immobilized on the means of support, thereby achieving higher functionality of its components.

17 Claims, 10 Drawing Sheets

(56) References Cited

U.S. PATENT DOCUMENTS

| | | | | |
|---|---|---|---|---|
| 6,973,812 B2 * | 12/2005 | Piermattei | ................. | A45F 5/02 |
| | | | | 70/459 |
| 7,093,389 B1 * | 8/2006 | Meier | ................... | A01M 1/106 |
| | | | | 43/132.1 |
| 7,363,745 B2 * | 4/2008 | Hsin-Chang | ............ | A01M 1/02 |
| | | | | 43/139 |
| 2007/0031183 A1 * | 2/2007 | Sim | ...................... | A01K 91/047 |
| | | | | 403/78 |
| 2007/0283608 A1 * | 12/2007 | Gunderson | ............ | G09F 23/00 |
| | | | | 40/634 |
| 2013/0152452 A1 * | 6/2013 | Lazzarini | ................ | A01M 1/02 |
| | | | | 43/121 |
| 2023/0072347 A1 * | 3/2023 | Bernal | ................. | A01M 1/106 |

* cited by examiner

13

31

14

ROTATING SUPPORT FOR INSECT TRAP

This application claims priority to Mexican Patent Application No. MX/a/2021/011918 filed Sep. 9, 2021, the entire contents of each of which are hereby incorporated by reference.

BACKGROUND

1. Field of the Invention

This invention refers to the monitoring and control of plagues, said monitoring and control may be carried out by means of insect traps, in which said insect traps must be supported or placed on specific areas, particularly, the present invention provides a rotating shaft for insect trap, thus allowing greater freedom of movement and higher functionality.

2. General Background of the Invention

With the purpose of facilitating the monitoring and control of the population of insects, the need to use of a variety of conventional traps is present, which use several support structures to place baits, said conventional traps can normally be placed on fixed or movable surface, in this respect, a placement shall considered as fixed, when said placement has been embedded, attached, assembled or in any other manner that allows to fix and immobilize the trap, in this regard, the process may be aided by big constructions or fixed solid structures, such as a tree, bridge, building, geological formation and any other which may provide sturdiness for the placement of the trap; therefore, taking into consideration that a trap shall be considered as mobile, when their location depends on a means to elevate or sustain the trap, thus releasing the trap with a single holding point, normally, and thus, in this context, a rotating support for insect traps of mobile or free placement has been developed, and in this context, we do hereby cite the following background of the invention.

U.S. Pat. No. 6,018,905, granted on Feb. 1, 2000, titled Kairomone insect trap for capture of corn rootworm, said trap shows a capture top dome, a capture reservoir, and a container containing a bait, the dome contains a bait holder attached to the capture top dome, and by means of an orifice in said holder, the trap is able to be hanged, thus carrying out its function, it is worth mentioning that if the trap rotated excessively, due to any external circumstance, the functioning of said trap would be compromised, as the bait may move or fall, in said trap by being static is vital; however, free rotation would increase the trap's efficiency.

U.S. Pat. No. 7,093,389 B1 granted on August of 2006 titled Flying insect trap, said invention describes a container containing a bait, with a cover that allows the entry of the insect through some openings, said trap contains a retractable support, from a folded to unfolded position, ready for use, said support structure goes through a slot in the cover, which is placed above the trap, thus forming the flying insect trap, in this invention, the support is provided in a fixed manner when unfolded and when hanged before a rotating motion, the foldable support would be forced to such extent, that said support may break, which would represent a serious inconvenient for the functioning of said insect trap.

In light of the above, due to the need of having a support for insect trap which shall improve the performance of our trap, this rotating shaft support for insect trap was engineered, which is adjustable to the insect trap, attaining a dynamic balance by supporting the insect trap adequately, increasing the functionality of the insect trap, and consequently, increasing the efficiency of said support; wherefore, in accordance with the background of the invention, a rotating shaft support for insect trap has not been found, such as the one herein presented.

SUMMARY OF THE INVENTION

This invention referred as a Rotating Support for Insect Trap, in which the insect trap has a connection mechanism to be attached to a rotating shaft support; thus, having a trap which is not affected by motion, as the rotatory shaft support remains fixed to the insect trap and fixed and immovable from the means of support, thus achieving a higher functionality of its components.

The object of the present invention is, therefore, to provide Rotating Support for Insect Trap, which shall provide freedom of movement for the trap while being supported by the rotating shaft support steadily.

Another purpose of the Rotating Shaft Support for Insect Trap is guaranteeing the adequate functioning of the insect trap at all times, before any pounding from nature or nature or any other external agent causing instability in the insect trap.

Another objective of the present invention, is the adaptability of the rotating support to the insect traps having connectors in their cover; thus, allowing to assemble the rotating support in an efficient manner.

A rotating support with the characteristics herein presented is of relevance, by providing a significant improvement for the functioning of insect traps, since, enhanced rotation improves the diffusion of the insect bait; therefore, independently from all existing external conditions, the diffusion of the insect bait is improved, thereby allowing to carry out the intended activity of attracting insects.

The characteristics of this novel Rotating Support for Insect Trap is detailed in the description below and the figures of the present invention.

BRIEF DESCRIPTION OF THE DRAWINGS

In order to complement the description above and with the purpose of facilitating the understanding of the characteristics of the invention, the description is accompanied, and being also part thereof, by a series of drawings, which include, but are not limited to.

DETAILED DESCRIPTION OF THE INVENTION

Below, a detailed description of the present invention is given with reference to the figures.

According to the present invention, the rotating support for insect trap comprises two main pieces, which are coupled to the means of use and support for the functioning of the invention, in this context, we observe in FIGS. 1 to 4 a support and rotation element 10 which is made of a resistant material in order to withstand the load of the insect trap and have a sufficiently high resistance in order to function in a rotating manner with no further complications, in this respect, we have that the support and rotation element 10 may be made of plastic materials, recycled plastics, metals, non-metal materials and their combinations, with a preference for plastic materials of higher resistance to friction, the support and rotation element 10, is a solid cylindrical longitudinal piece with a cylindric base 12, this support and rotation element shall have a top part and a bottom surface on its base 16 of cylindrical shape, with a bigger diameter of the base 12 in comparison with the cylindrical body 11 of the support and rotation element 10, thereby establishing the longitudinal edges of the support and rotation element 10.

Figure 1:
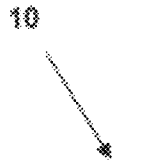
FIG. 1. Main isometric view of the support and rotation element.
Figure 1:
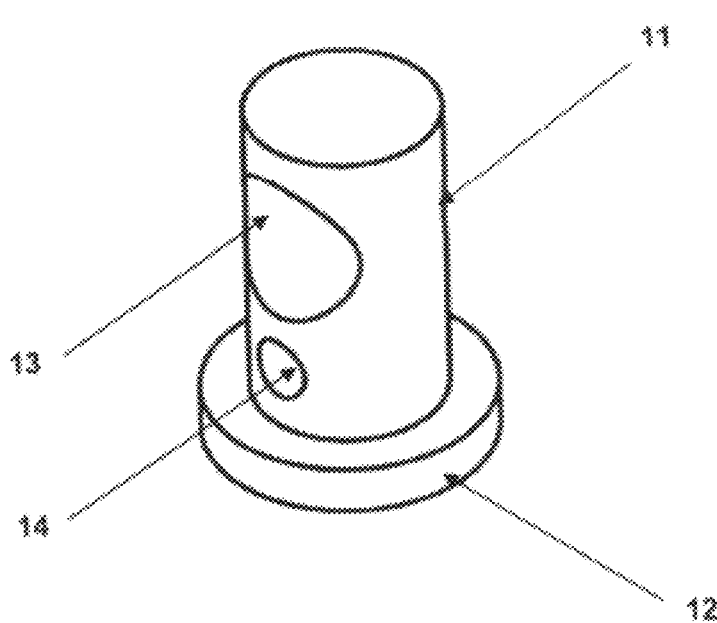
Figure 2:
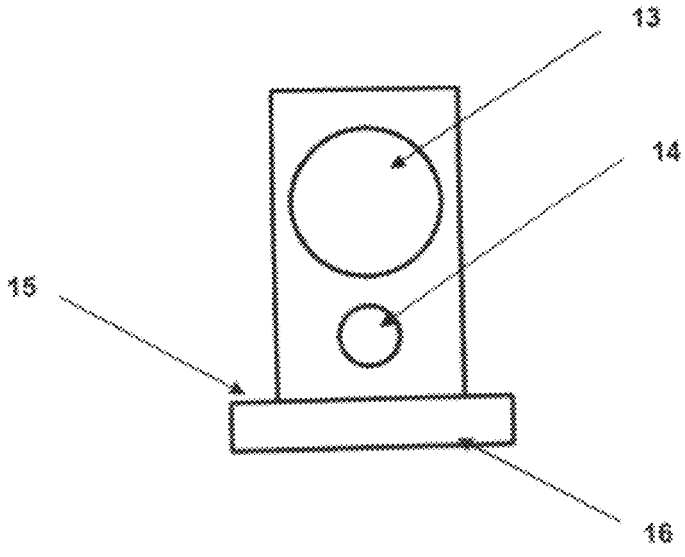
FIG. 2. Main frontal view of the support and rotation element.
Figure 3:
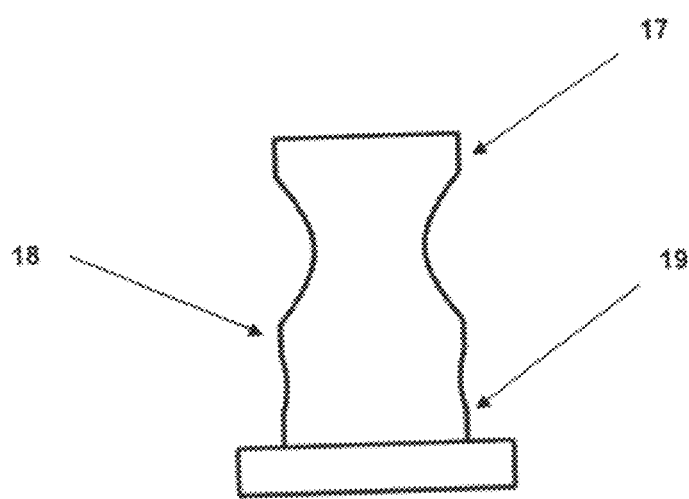
FIG. 3. Main lateral view of the support and rotation element.

In FIGS. 1 to 3, you may observe the support hole 13, which is located in the top part of the cylindrical body 11, said hole or passage crosses longitudinally and horizontally through the cylindrical body 11, and this passage has the function of hosting the means to sustain the insect trap, this hole has a circular shape, as observed in FIGS. 1 to 3, but it may have a quadrangular, oval, or polyhedral shape; thus, allowing the entry of the means of support.

Additionally, said cylindric body 11 has an additional support hole or passage 14, which, just as support hole 13 is a hole that crosses longitudinally and horizontally through the cylindrical body, located in the lower part of support hole 13, which shall allow the storage of a means of signaling for the insect trap, in this additional support hole 14, a card holder, with warnings related to the contents of the insect trap or signaling methods, according to the use of the insect trap, additionally, the hole shows a circular shape, as seen in FIGS. 1 to 3, but said hole may have a quadrangular, oval or polyhedral shape; thus, allowing the entry of means to display signals or any intended information.

Figure 5:
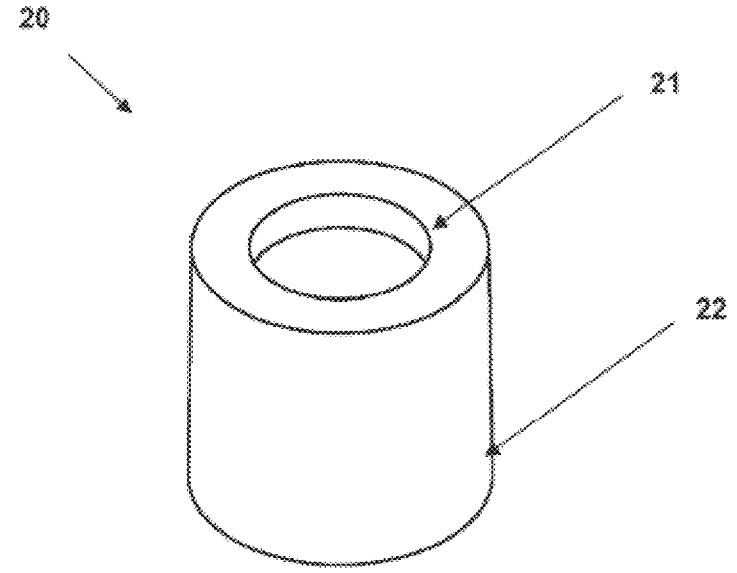
FIG. 5. Main isometric view of the coupling element.

In FIG. 2 we have that the support and rotation element 10, has a top surface of the base 15 and a bottom surface of the base 16, said top surface of the base 15 shall have the function of supporting and allowing the rotation with the coupling element 20, which is observed in FIG. 5, the detail of said interaction is described in detail below, continuing, said base 12 for the support and rotation element 10 must be sufficiently thick and resistant in order to allow the support and rotation of the insect trap 50, with no excessive wearing of said parts.

In FIG. 3, you may observe the placement of holes 13 and 14, in which, between said holes, with an upper section 17 of the cylindrical body, which defines the part of the upper support hole 13; thus, having the intermediate section 18, which defines the lower part of the upper support hole, and the upper part of the additional hole 14, and finally we have base section 19, which defines the inferior part of additional support hole 13, and its lower part is attached to the base 12 of the support and rotation element.

Figure 4:
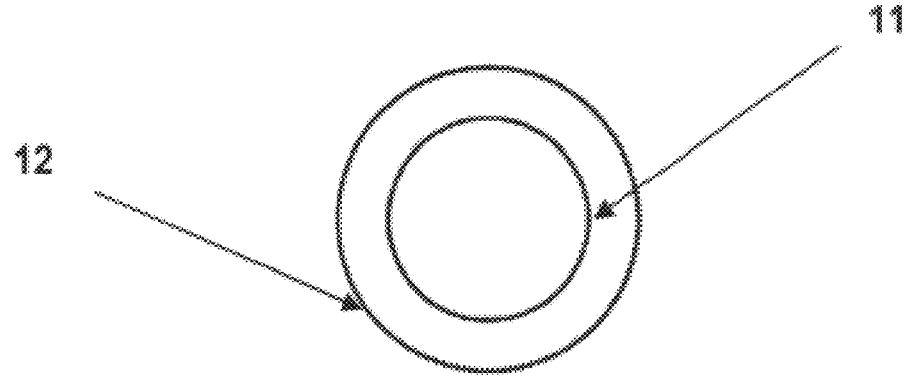
FIG. 4. Main top view of the support and rotation element.

FIG. 4 shows the main top view of the support and rotation element 10, showing the diameter of the cylindrical body 11, which has smaller diameter than the diameter of the base 12, said difference in diameters is essential for the assembly of the rotating support 30 showed in FIGS. 7 to 10, mainly.

Figure 6:
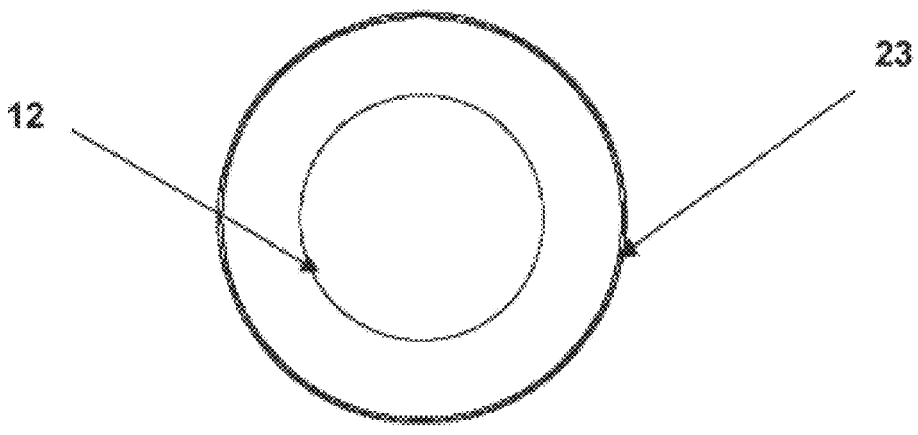
FIG. 6. Main top view of the coupling element.
Figure 7:
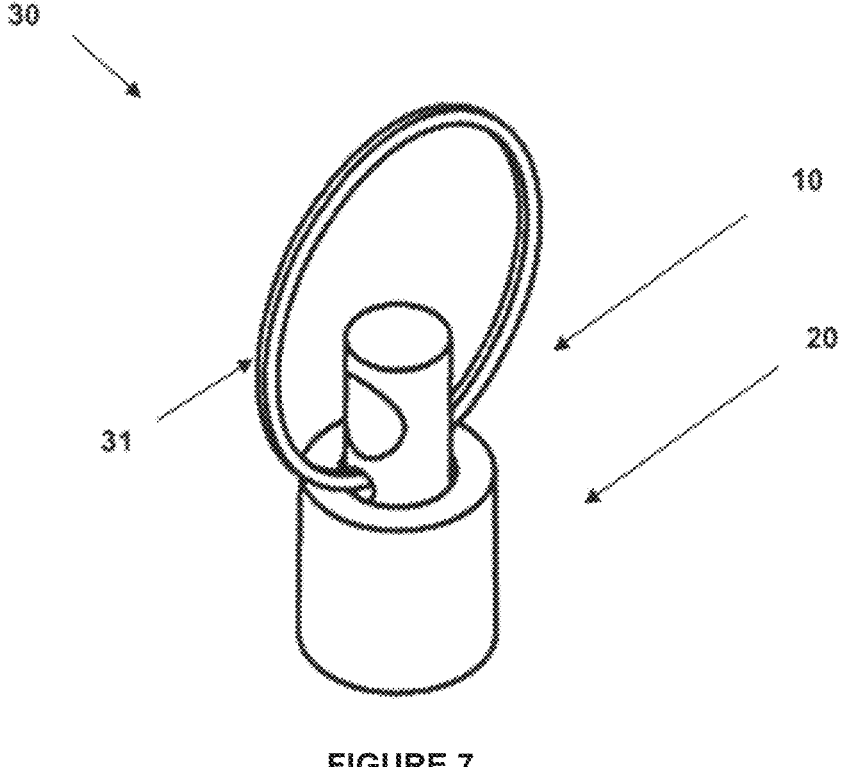
FIG. 7. Main lateral view of the rotating support.

Continuing with the description of the elements that make up the rotating support 30, we have the second element, which has the function of coupling the insect trap 50, which shall be detailed below, and the support and rotation element 10; in FIGS. 5 and 6, the coupling element 20 can be observed, being a longitudinal vertical cylinder, with an external surface 22, having two holes in its central part, in FIG. 5, the internal passage 21 of the coupling element 20 can be observed, which has a bigger than the cylindrical body 11, of the support and rotation element, said internal passage is formed from a hole that longitudinally crosses the entirety of the coupling element 20, and its base has a hole, which slightly or equal to the measurement of the coupling support 44, observed in FIG. 13, which shall be detailed below, said hole in the base of the coupling element 20, does not cross the entirety of said element; therefore, its upper part is where the internal passage 21 is found, forming a cover.

Figure 8:
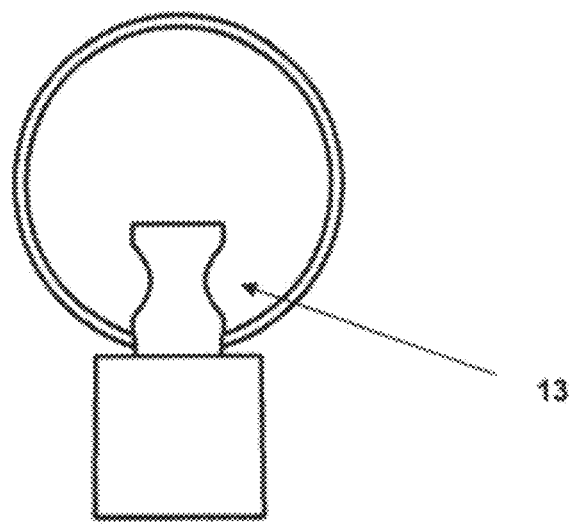
FIG. 8. Main front view of the rotating support.
Figure 9:
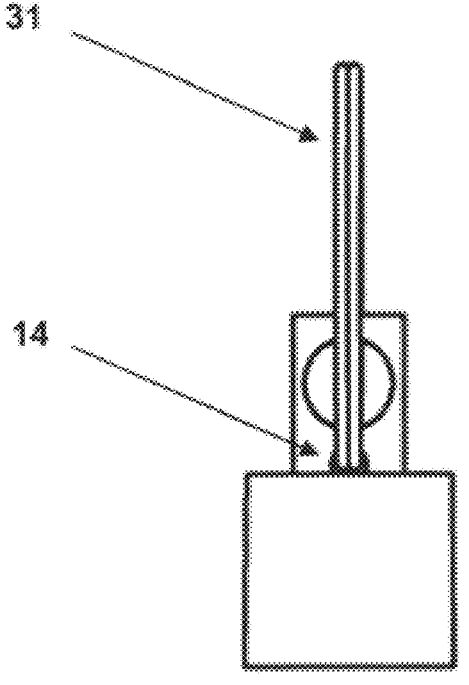
FIG. 9. Main front view of the rotating support.

In FIGS. 7 to 10, the present invention has a rotating support 30, said figures show the attachment of the support and rotation element and the coupling element 20, additionally, the invention has a support ring 31, which is introduced through the additional 14, FIGS. 8 and 9 show in detail the arrangement of the support ring 31 in the additional hole 14; thereby observing with clarity the placement of support hole 13, both holes protrude from the coupling element, when both of them are attached, as observed in said figures, it is worth noting that the support ring 31 for cardholders help to keep all support and rotation pieces together, as well as the coupling element, when said pieces had not been mounted on the trap yet; thus preventing the loss of pieces, being ready to be attached to the traps.

Figure 10:
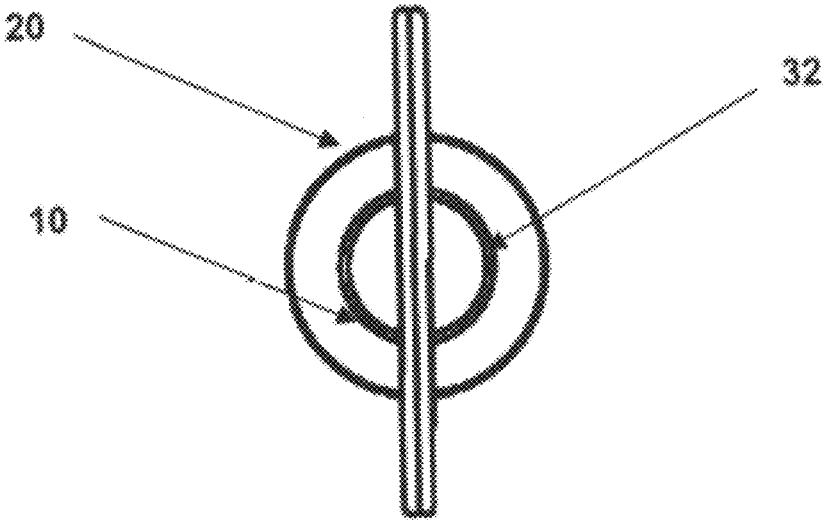
FIG. 10. Main top view of the rotating support.

FIG. 10 shows the separation 32, between the support and rotation element 10 and the coupling element 20, said separation is essential 32 in said pieces, as said point generates the rotation between both pieces, therefore, the coupling of said pieces must not be adjusted or forced; therefore, a separation 32 must exist, thus achieving the adequate function of both pieces, in order to obtain the best results.

Figure 11:
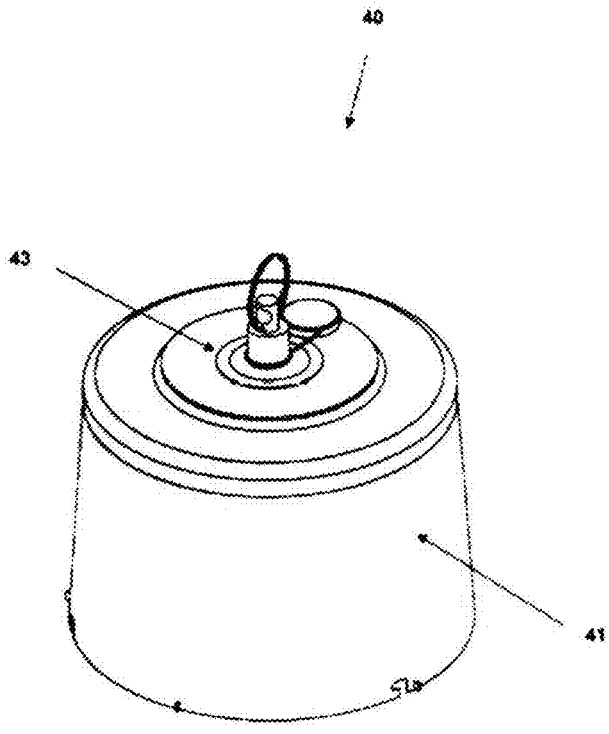
FIG. 11. Main isometric view of the rotating support attached to the insect trap supporting a retaining ring.
Figure 12:
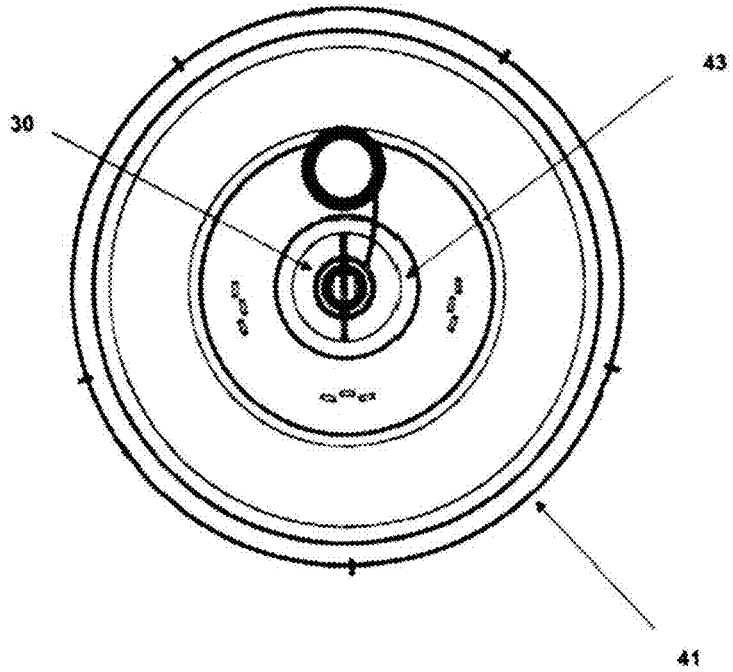
FIG. 12. Main top view of the rotating support attached to the insect trap.

FIGS. 11 and 12 show the rotating support 30 attached to a cover 41 for the insect trap 50, as well as the support ring 31 for cardholders, with the possibility of entering a support hook (not displayed) which is inserted in the support hole 13 or any other means that is able to carry out the function of holding in an adequate manner the insect trap, it is worth mentioning that the present invention may have a support for the invention, achieved by directly placing in the support hole 13, a hook, rope, cable, or any other means to achieve the adequate support of the invention; at the same time, in the present invention the rotating support 30 is placed in the upper part of the cover 43 of the rotating support with cover 40.

Figure 13:
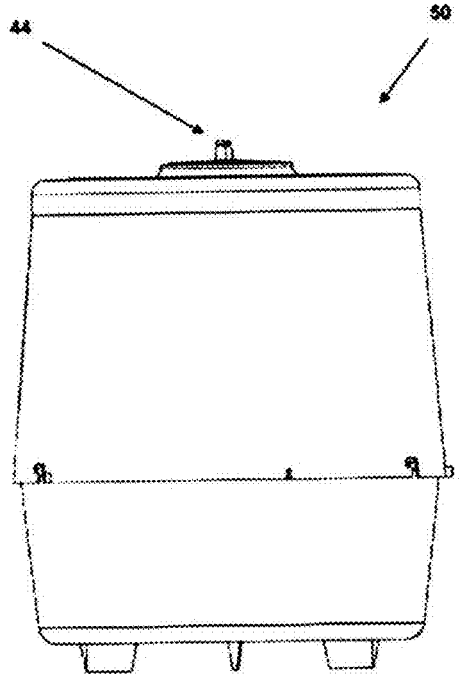
FIG. 13. Main isometric view of the insect trap showing the coupling connector for the rotating support.

FIG. 13 shows the insect trap 50, which has a coupling support 44 for an insect trap, in which said support 44 has a cylindrical shape, with a circular higher part, which is smaller than the base, this feature is adequate in order to carry out an optimal coupling of the rotating support 30, however, it is worth mentioning that the coupling support 44, may show any configuration, which may be adequate for the coupling with the rotating support 30, it is worth mentioning that the rotating support 30 has been specifically designed to support insect traps and provide optimum functionality for said traps.

Figure 14:
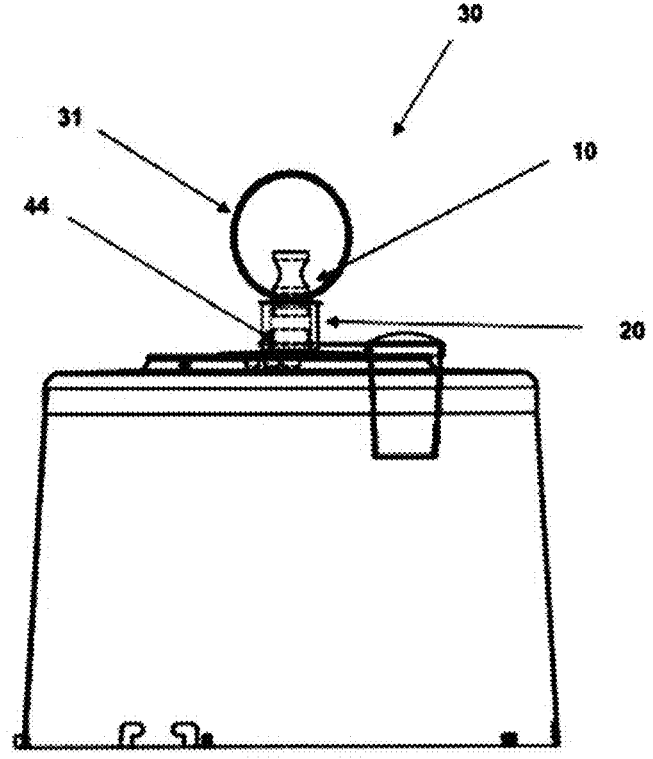
FIG. 14. Main front view of the rotating support attached to the insect trap's cover detailing the coupling connector.

FIG. 14 shows the internal part of the rotating support 30, which shows the coupling element 20 connected to the coupling support 44 tightly, thus achieving a strong coupling, which shall be capable of holding the insect trap 50, said attachment may be achieved mechanically by joining said pieces or by using glue, pouring a solution between these two pieces, based on experience, in order to achieve a tighter junction between the rotating support and the trap, the use of material with equal properties is preferred, preferring the use of plastics; thus achieving a fixed junction between both pieces, the support and rotation element 10 is observed, which is in contact with the inner surface of the upper part 22, without touching the walls of the cylindrical body 11, which allows having two main elements of the present invention, without a fixed coupling between said elements, thus allowing free rotation between both pieces and consequently, preventing any type of stagnation or knots in the hook when the insect trap 50 is hanged by means of a hook, rope, wire, cable or any other means capable of supporting the insect trap.

It is worth mentioning that the cover 41 assembled with the placement of the support and rotation element, the coupling element 20 and the support ring for identification cards 31, may be stacked on top of the other cover 41, already assembled; thus, being stackable and allowing a reduction in space, improving transportation. In order to have a better understanding of the invention, below, a list has been included, with all the parts that make up the Rotating Support for Insect Trap.

10 support and rotation element
11 cylindrical body of the support and rotation element
12 base of the support and rotation element
13 support hole
14 additional support hole
15 top face of the base
16 bottom face of the base
17 upper section
18 intermediate section
19 base section
29 coupling element of the support
21 internal passage of the coupling element
22 external surface of the coupling element
23 outer diameter of the coupling element
24 inner diameter of the coupling element
30 rotating support
31 support ring for identification cards
32 separation between the pieces
40 rotating support with insect trap cover
41 insect trap support
43 upper part of the cover
44 coupling support of the insect trap
50 insect trap
The invention claimed is:

1. An insect trap, comprising:
a cover, wherein the cover comprises:
an upper part; and
a coupling support extending from the upper part; and
a rotating support, wherein the rotating support comprises:
a longitudinal central element;
a coupling element; and
a support ring, wherein:
the longitudinal central element includes a cylindrical body and a base, the base of the longitudinal central element includes a top surface and a bottom surface,
the base of the longitudinal central element has a diameter larger than a diameter of the cylindrical body of the longitudinal central element,
the cylindrical body of the longitudinal central element includes a lower support hole and an upper support hole,
the upper support hole has a first diameter,
the lower support hole has a second diameter,
the first diameter of the upper support hole is larger than the second diameter of the lower support hole,
the lower support hole is located below the upper support hole,
the coupling element is a longitudinal vertical cylinder with an external surface, and the coupling element includes a hollowed-out space having a diameter larger than the diameter of the cylindrical body of the longitudinal central element,
the coupling element is configured to couple together with the longitudinal central element by inserting the cylindrical body of the longitudinal central element within the hollowed-out space, and by passing the cylindrical body of the longitudinal central element through an opening of the coupling element, and
the support ring is configured for insertion through the lower support hole and causes the longitudinal central element and the coupling element to be held together by preventing the coupling element from de-coupling from the longitudinal central element thereby allowing union of the longitudinal central element and the coupling element,
wherein:
the coupling element of the rotating support is configured to be connected to the coupling support of the cover with the coupling support of the cover being inserted into the hollowed-out space of the coupling element of the rotating support, and
a diameter of an outer periphery of the cover is larger than an entire height of the coupling element of the rotating support.

2. The insect trap of claim 1, wherein the coupling element of the rotating support is fixedly connected to the coupling support of the cover.

3. The insect trap of claim 1, wherein the support ring is inserted into and through the lower support hole.

4. The insect trap of claim 1, wherein a separation exists between the longitudinal central element and the coupling element.

5. The insect trap of claim 4, wherein the separation between the longitudinal central element and the coupling element allows for rotation between the longitudinal central element and the coupling element.

6. The insect trap of claim 1, wherein the cylindrical body includes an upper section, an intermediate section, and a base section.

7. The insect trap of claim 6, wherein the upper section defines an upper part of the upper support hole.

8. The insect trap of claim 6, wherein the intermediate section defines a lower part of the upper support hole and an upper part of the lower support hole.

9. The insect trap of claim 6, wherein the base section defines a lower part of the lower support hole and is attached to the base of the longitudinal central element.

10. The insect trap of claim 6, wherein the intermediate section resides between the lower support hole and the upper support hole.

11. The insect trap of claim 1, wherein the longitudinal central element is made of plastic materials with friction resistance.

12. The insect trap of claim 1, wherein the support ring allows for placement of a card holder configured to show warnings in relation to materials contained in the insect trap or signaling methods, according to use of the insect trap.

13. The insect trap of claim 12, wherein the upper support hole is configured to allow a hook, a rope, a wire, or a cable to be inserted in the upper support hole.

14. The insect trap of claim 12, wherein the upper support hole and the lower support hole have at least a circular shape.

15. The insect trap of claim 1, wherein the top surface of the base of the longitudinal central element supports the coupling element and allows for rotation between the longitudinal central element and the coupling element.

16. The insect trap of claim 1, wherein the upper support hole defines a concave shape in a lateral view of the longitudinal central element.

17. The insect trap of claim 1, wherein the lower support hole defines a concave shape in a lateral view of the longitudinal central element.

* * * * *